United States Patent
Naylor

(10) Patent No.: US 8,423,694 B2
(45) Date of Patent: Apr. 16, 2013

(54) METHOD AND DEVICE FOR PRIORITY GENERATION IN MULTIPROCESSOR APPARATUS

(75) Inventor: Rowan Nigel Naylor, Basingstoke (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 310 days.

(21) Appl. No.: 12/746,521

(22) PCT Filed: Dec. 8, 2008

(86) PCT No.: PCT/EP2008/067022
§ 371 (c)(1),
(2), (4) Date: Sep. 6, 2010

(87) PCT Pub. No.: WO2009/074536
PCT Pub. Date: Jun. 18, 2009

(65) Prior Publication Data
US 2011/0004714 A1 Jan. 6, 2011

Related U.S. Application Data

(60) Provisional application No. 61/015,888, filed on Dec. 21, 2007.

(30) Foreign Application Priority Data

Dec. 11, 2007 (EP) .................................. 07122846

(51) Int. Cl.
*G06F 13/36* (2006.01)
(52) U.S. Cl.
USPC .......................... 710/116; 710/241; 710/244

(58) Field of Classification Search ............... 710/116, 710/241, 244
See application file for complete search history.

(56) References Cited

U.S. PATENT DOCUMENTS

| 5,025,370 A | 6/1991 | Koegel et al. |
| 5,560,016 A | 9/1996 | Fiebrich et al. |
| 2004/0059879 A1* | 3/2004 | Rogers .......................... 711/154 |
| 2009/0006165 A1* | 1/2009 | Teh et al. ........................... 705/8 |

FOREIGN PATENT DOCUMENTS

| EP | 0 374 521 A2 | 6/1990 |
| GB | 2 372 916 A | 9/2002 |

OTHER PUBLICATIONS

PCT International Search Report, dated Mar. 23, 2009, in connection with International Application No. PCT/EP2008/067022.

* cited by examiner

*Primary Examiner* — Glenn A Auve
(74) *Attorney, Agent, or Firm* — Potomac Patent Group PLLC

(57) ABSTRACT

A device for generating a priority value of a processor in a multiprocessor apparatus, the device comprising a counter, an interface for receiving signals from an arbiter, wherein the signals indicate decision of the arbiter about granting or denying access to a common resource in said multiprocessor apparatus. The counter is adapted to change its value in response to said signal and the changes of the counter go in opposite directions depending on the type of signal received from the arbiter. The device is also adapted to send the modified value of the counter as a new priority value to the arbiter.

16 Claims, 6 Drawing Sheets

METHOD AND DEVICE FOR PRIORITY GENERATION IN MULTIPROCESSOR APPARATUS

CROSS-REFERENCE TO RELATED APPLICATIONS

This application claims priority under 35 U.S.C. §119 to European Patent Application No. 07122846.4, filed Dec. 11, 2007, which is hereby incorporated herein by reference in its entirety. This application also claims the benefit of U.S. Provisional Application No. 61/015,888, filed Dec. 21, 2007, which is hereby incorporated herein by reference in its entirety.

TECHNICAL FIELD

The present invention relates to access to a shared resource in a multiprocessor apparatus, in general, and in particular to arbitration mechanism for controlling access to the shared resource.

BACKGROUND

Modern single chip digital systems employ multiple processors but for cost reasons a single external memory or other shared resource. In order to obtain maximum efficiency of use of the available resource and ensure each processor gets an adequate share of the resource it is necessary to implement an arbitration system. The function of the arbitration system, also referred to as an arbiter, is to decide which of the devices requesting access to the resource will have the access granted.

In one example granting the access is based on a first in-first served basis. This may result in granting access to relatively unimportant processes at the expense of important ones.

In another example known in the art the access is granted based on a round-robin basis. Each of the devices has assigned a time-slot in which it can access the resource and after expiration of the assigned time-slot ownership of the resource is handed over to another device and it has to wait for another time-slot in order to access the resource. The drawback of this solution is that during some time-slots the resource is not used if the device associated with this time-slot does not need the resource.

In yet another solution known in the art the decision of the arbiter is based on a parameter assigned to each of the devices known as priority. A device requesting access having the highest priority is granted the access. The disadvantage of this solution is that a fixed priority does not take into account behaviour of the users of the resource and changes of priorities have to be initiated and executed by the user.

SUMMARY

It is the object of the present invention to obviate at least some of the above disadvantages and provide an improved method of controlling access to the resource and a device for generation priority value of the assigned processor.

Accordingly, the invention seeks to preferably mitigate, alleviate or eliminate one or more of the disadvantages mentioned above singly or in any combination.

According to a first aspect of the present invention there is provided a method of controlling access to a shared resource in a multiprocessor apparatus. In this system the processors request access to the resource and an arbiter grants or deny the access based on priority values assigned to the processors. A priority value for an individual processor is generated by a priority generator by maintaining a counter, receiving a signal from the arbiter indicating access granted or access denied decision. The arbiter transmits these signals at least to those processors which requested access to said resource. Once the signal is received, changing the value of the counter upon receipt of said signal, wherein the changes of the counter go in opposite directions depending on the type of signal received from the arbiter. The modified value of the counter is then sent as a new priority value to the arbiter.

According to a second aspect of the present invention there is provided a device for generating a priority value of a processor in a multiprocessor apparatus. The device comprises a counter and an interface for receiving signals from an arbiter. The signals indicate decision of the arbiter about granting or denying access to a common resource in said multiprocessor apparatus. The counter is adapted to change its value in response to said signal and the changes of the counter go in opposite directions depending on the type of signal received from the arbiter. The device is also adapted to send the modified value of the counter as a new priority value to the arbiter.

According to a third aspect of the present invention there is provided a multiprocessor apparatus comprising a resource shared by at least part of said processors, and plurality of priority generators in accordance with the second aspect of the present invention. The priority generators are assigned to said processors. The apparatus further comprises an arbiter for controlling access to said shared resource. Said arbiter is adapted to send a signal indicating granted access to one of said priority generators that has been granted access and a signal indicating access denied to priority generators, which have not been granted access.

Further features of the present invention are as claimed in the dependent claims.

The present invention provides the benefit of finer and automatic control of access to the shared resource allowing higher efficiency allowing greater performance and so more work to be done by the system. Additionally it provides better control of the latency of access to the resource allowing the system to avoid automatically situations where the delay in access to the resource causes the associated process to fail. Finally, there is also the benefit of automatic operation and adaptation to traffic freeing the processor/s from this task and as a result freeing the processors to do more work.

BRIEF DESCRIPTION OF THE DRAWINGS

The present invention will be understood and appreciated more fully from the following detailed description taken in conjunction with the drawings in which.

DETAILED DESCRIPTION

The present invention in its various embodiments is applicable to access control to a shared resource in a multiprocessor apparatus in which an arbiter grants access based on priority value associated with the processors requesting the access.

The term "processor" refers to any component in the apparatus that is capable of requesting access to the shared resource. It includes, but is not limited to, microprocessors also referred to as CPUs (Central Processing Units), digital signal processors (DSPs), hardware accelerators as well as microprocessors having more than one bus and in effect being more than one requesting source.

Figure 1:
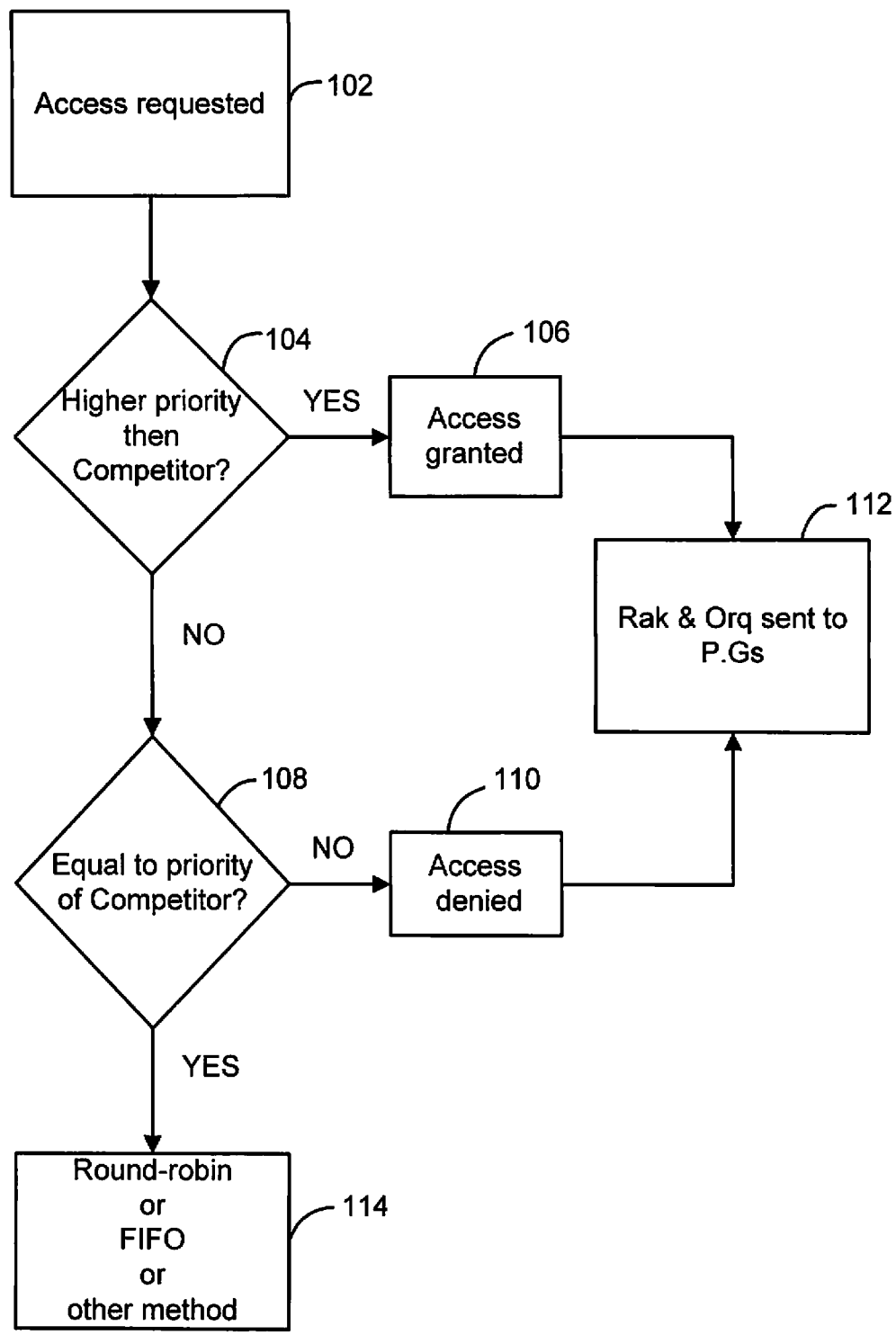
FIG. 1 is a diagram illustrating operation of an arbiter of an apparatus in one embodiment of the present invention.
Figure 2:
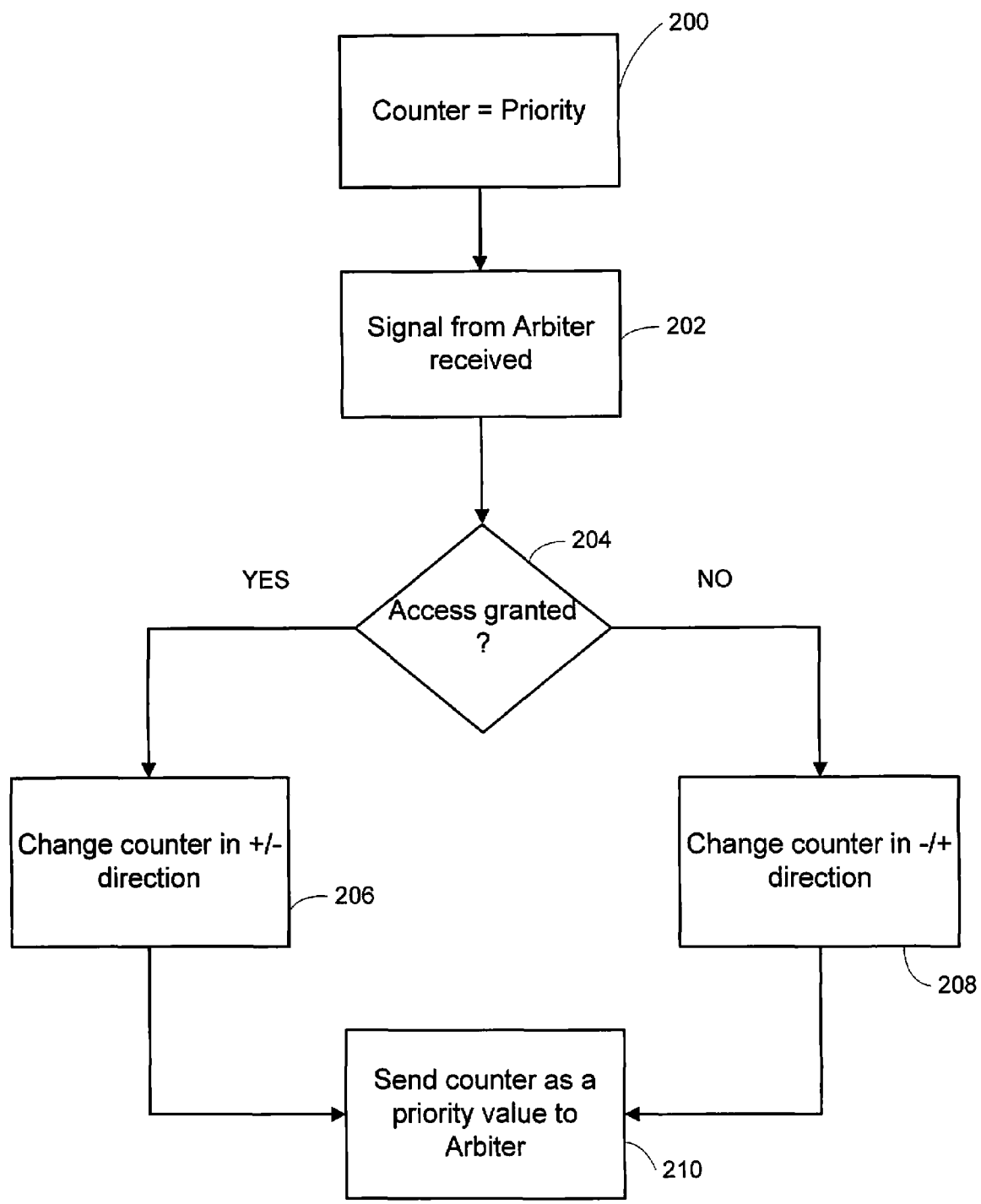
FIG. 2 illustrates a flowchart of a method of controlling access to a shared resource in one embodiment of the present invention.
Figure 5:
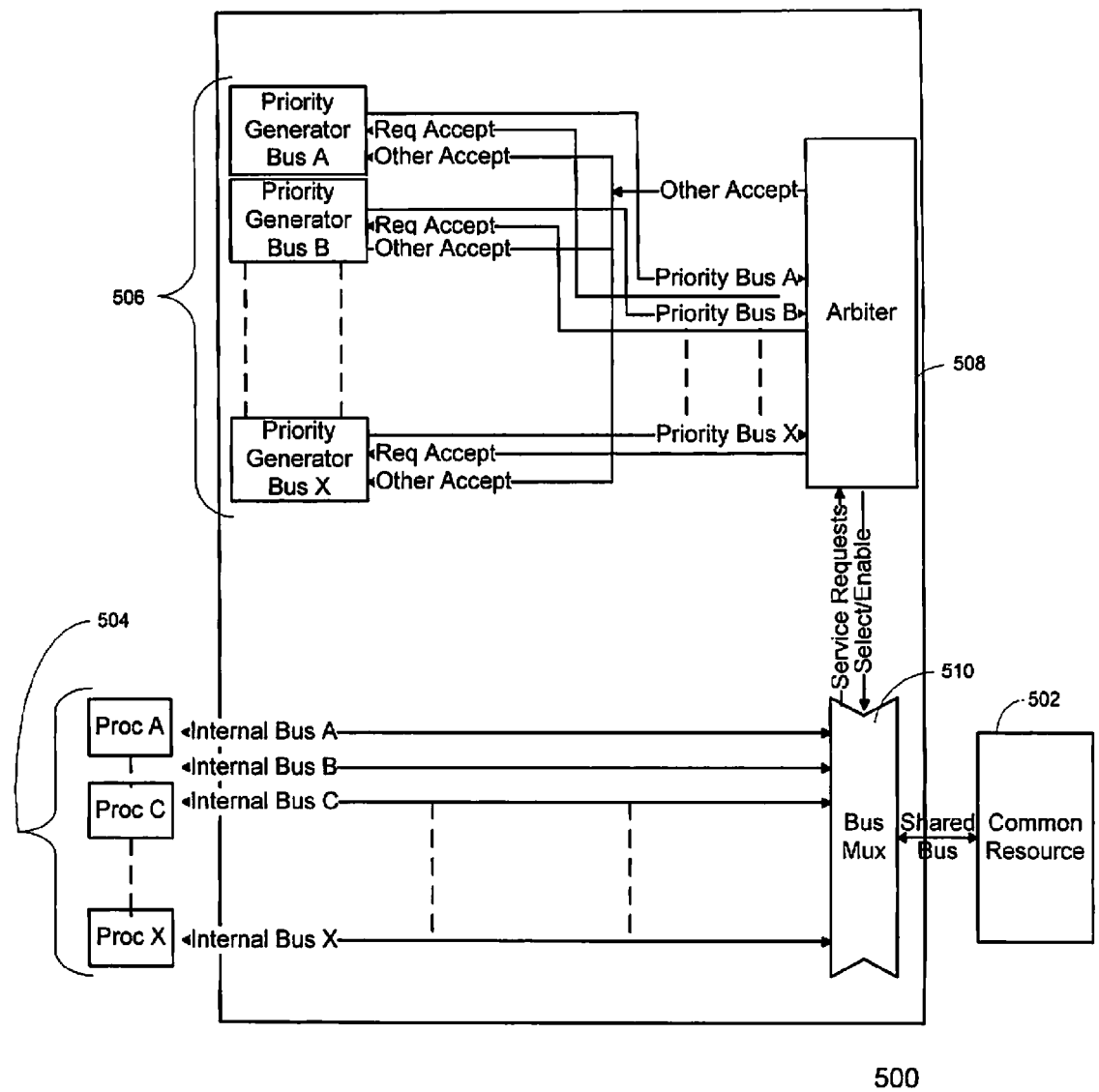
FIG. 5 is a diagram illustrating a multiprocessor apparatus in one embodiment of the present invention.

In operation, as illustrated in FIG. 1 and FIG. 5 once the arbiter 508 receives a request, 102, for access to the resource, 502, it is checked by the arbiter 508 if there is other processor 504 competing for the same resource with higher priority, 104. The processor with the highest priority is granted the access, 106, and all the other processors competing are denied access, 110. The arbiter then sends two types of signals to priority generators associated with the processors 112. The priority generator 506 of the processor 504 that won the access to the shared resource 502 receives Rak signal indicating access granted decision and the remaining priority generators 506 receive Orq signal indicating access denied decision. In a preferred embodiment the Orq signal is sent to those processors which requested and have been denied access to the shared resource. In an alternative embodiment the Orq signal is sent to all processors connected to the arbiter with the exception of the processor, which has been granted access (as it receives the Rak signal). In the unlikely situation of two competing processors having equal and highest priority, 108, one of the methods known in the art is used to resolve the conflict, 114.

In one embodiment of the present invention the priority generator maintains a counter 200, which value is the priority value of the associated processor and it may be changed during operation depending on the behaviour of the multiprocessor apparatus. Once the priority generator received 202 a signal from the arbiter it checks if it is a signal indicting access granted decision or denied decision, 204. The priority generator changes value of the counter in a direction that depends on the type of the signal it received, 206, 208 and mode of operation it has been setup to obey.

In one embodiment after receiving signal indicating access granted decision the counter value is increased (this is also referred herein as ascending mode) and access denied signal causes the counter to decrease the value of the counter.

Alternatively, after receiving signal indicating access granted decision the counter value is decreased (this is also referred herein as descending mode) and access denied signal causes the counter to increase the value of the counter.

In this approach the function of granting access to the shared resource reacts to the overall behaviour of the apparatus. Priorities are dynamically adjusted to the actual needs of the processors.

Once the counter value is changed, 206 or 208, the priority generator use the new value to send, 210, to the arbiter in order to be used in the next decision on granting access to the shared resource.

Figure 3A:
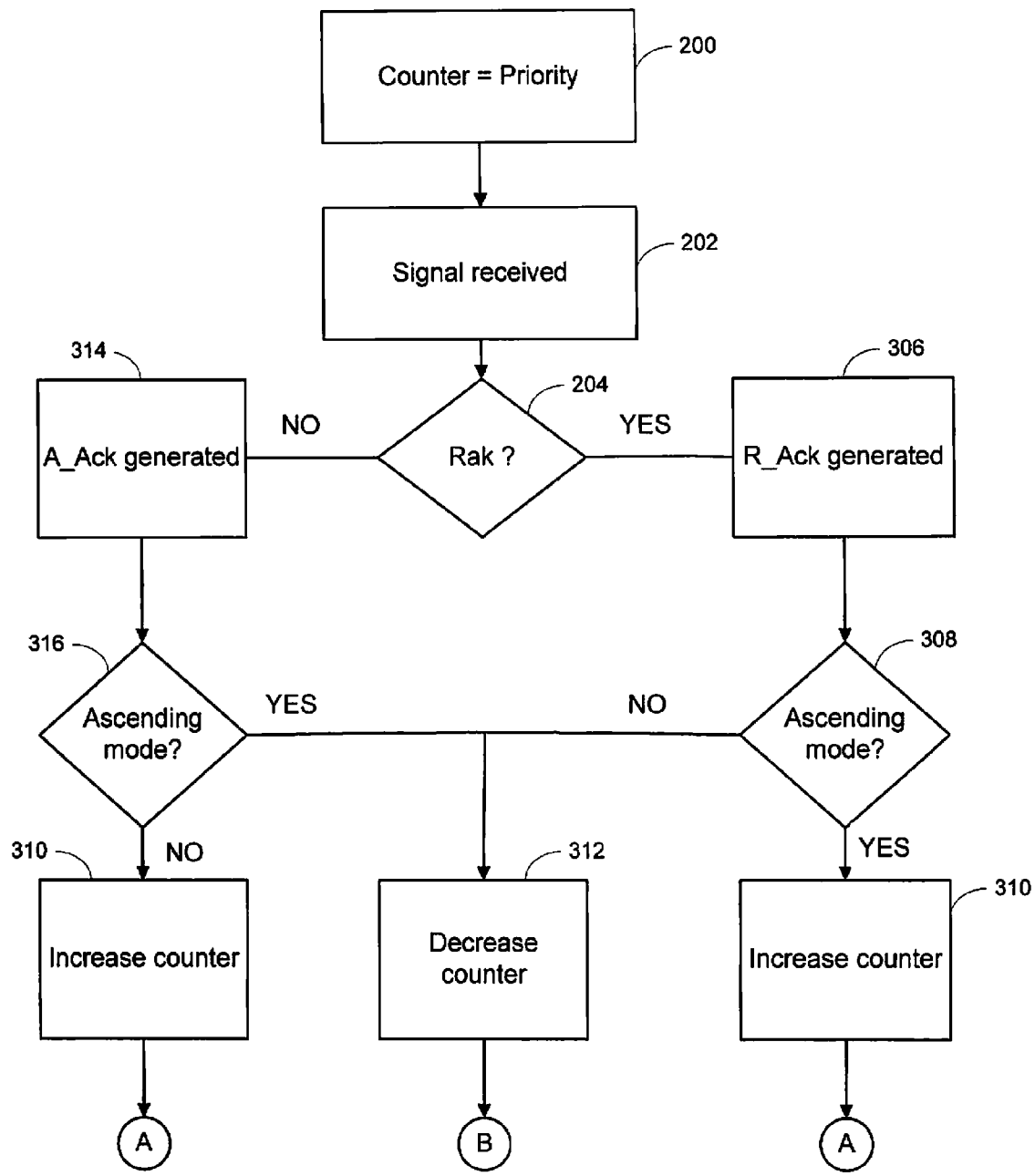
FIG. 3A and FIG. 3B illustrate flowcharts of a method of controlling access to a shared resource in one embodiment of the present invention.
Figure 3B:
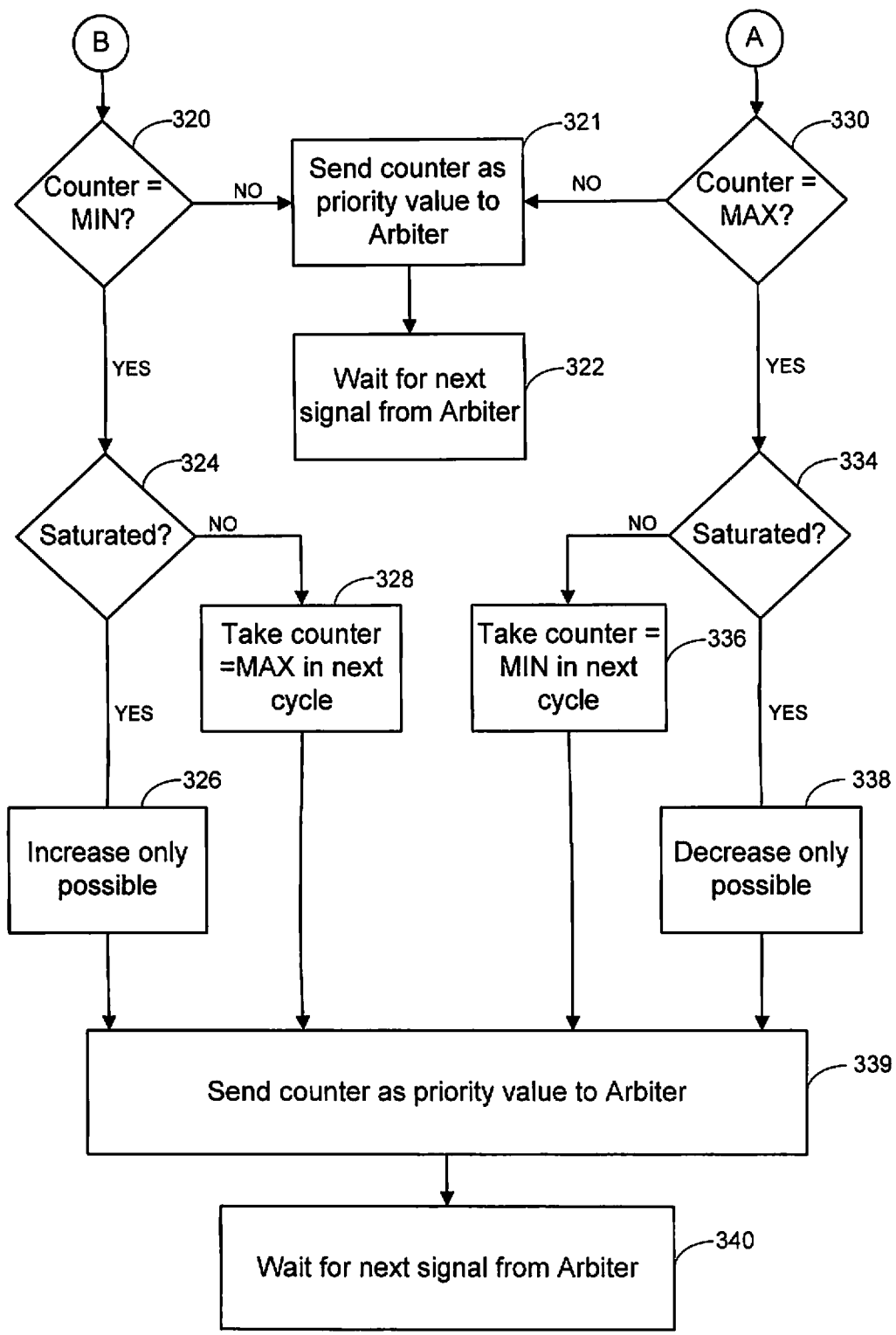

With reference to FIG. 3A, FIG. 3B and FIG. 5 a preferred embodiment of the present invention is illustrated. When a signal from the arbiter is received at an interface 404 it is converted (decoded) to a pulse. The two signals are converted at the interface in a way that one pulse is generated when any bus is granted access other than the one associated with this PG (A_Ack) 314, the second when this PG is granted access (R_Ack), 316. This means that reception of Rak signal at the interface results in R_Ack pulse being generated and reception of Orq signal at the interface 404 results in A_Ack pulse being generated. Depending on the mode of the priority generator the counter value changes as previously discussed and then is sent to the arbiter as a priority value, 321.

Assuming that the priority generator 400 is in ascending mode reception 204 of the Rak signal results in R_Ack pulse being generated 306 and increasing the counter, 308, 310. If Orq signal is received, 204, A_Ack pulse is generated and the counter is decreased, 312.

In a preferred embodiment the value of the counter is limited from the top and bottom. There are two different ways of handling the situation when the counter value reaches the limit. In one embodiment when the counter reaches the limit 320, 330 it automatically takes the value of the opposite limit as the new counter value 328, 336. This type of operation is further referred herein as non-saturated. That means if the counter reaches its upper limit, 330, it automatically changes its value to the value of the lower limit 336. Alternatively, if the counter reaches its lower limit, 320, it automatically changes its value to the value of the upper limit 328. When the counter value is changed its value is sent as a priority to the arbiter 339.

Alternatively the priority generator may work in a saturated mode, 324, 334. In this mode after reaching value of the upper limit, 330, the counter reacts only to signals that cause decrease of the counter, 338. That is, in the ascending mode after reaching value of the upper limit 330 the counter does not increase, 338, upon receipt of Rak signal, however, receipt of Orq signal causes the counter to decrease by 1, 338, and in the next cycle the counter can change in the up direction (as it is not equal to the upper limt). The counter value is sent to the arbiter as a priority value of the associated processor, 339.

Similar operations are performed when the priority generator 400 is in saturated mode 324 and the counter reaches its lower limit 320. The difference is that the counter value cannot decrease below the lower limit, 326, and the counter reacts only to signals that cause increase of the counter, 326. When saturation is enabled the counter stops at the limit and can only count in the opposite direction, 326, 338. For example on reaching the maximum it will increment no further but stay at this value unless it receives a decrement in which case it will count down. On reaching the minimum it will decrement no further but stay at this value unless it receives an increment in which case it will count up.

Modes

From the combination of the various modes of operation discussed, i.e. ascending, descending, saturated, non-saturated it is possible to create four combined modes of operation.

These include: saturated ascending, saturated descending, non-staturated ascending and non-saturated descending.

Saturated Ascending

In this mode the saturation is enabled and the priority generator's counter 402 increments when its bus is granted access and decremented when another bus is granted access. In this mode the priority tends to the minimum limit but rises to a maximum the more frequently the bus requests. This can be used where the user makes occasional accesses in which case it gets a nominal (its minimum) priority where latency is acceptable but should it stream data where perhaps internal buffering is limited then it can get more bandwidth as its demand increases. As demand drops its priority drops allowing other users more bandwidth. By setting min and max limit other users can be guaranteed use.

Saturated Descending

In this mode the saturation is enabled and the priority generator's counter 402 decrements when its bus is granted access and incremented when another bus is granted access. In this mode the priority tends to the maximum limit but drops to a minimum the more frequently the bus requests. This can be used where the user makes occasional accesses requiring low latency in which case it gets a nominal (its maximum) priority where latency is critical but should it start to increase it demands and possibly block other users then its priority drops allowing other users access. As its demand drops its priority returns to the higher level.

Non-Saturate Ascending

In this mode the counter loops and when the limit is breeched there is a steep change to the other limit. In this mode the counter is used in one direction only, the other being disabled. In ascending mode the decrement input is disabled. The bus priority starts at its minimum and ascends as the bus demand increases, at reaching the maximum value the minimum is loaded and the process repeated. This is used in situations where there are multiple busses in groups of similar performance needs, this allows each to use the resource equally but tries to minimise the average latency based on the relative demands. As a group the users in this mode have a nominal low priority that rises allowing them to gain more bandwidth relative to another group, maybe fixed priority, as the demand increases but the loop prevents them blocking other groups.

Non-Saturate Descending

In this mode the counter loops and when the limit is breeched there is a steep change to the other limit. In this mode the counter is used in one direction only the other being disabled. In descending mode the increment input is disabled. The bus priority starts at its maximum and descends as the bus demand increases, at reaching the minimum value the maximum is loaded and the process repeated. This is used in situations where there are multiple busses in groups of similar performance needs, this allows each to use the resource equally but tries to minimise the average latency based on the relative demands. As a group the users in this mode have a nominal high priority that descend allowing other groups to gain more bandwidth relative to this group as their demand increases preventing the group from blocking other users. The loop also prevents this group itself from being blocked.

After modifying its value the priority generator waits for another signal from the arbiter in order to modify the value of the counter, 322, 340.

Figure 4:
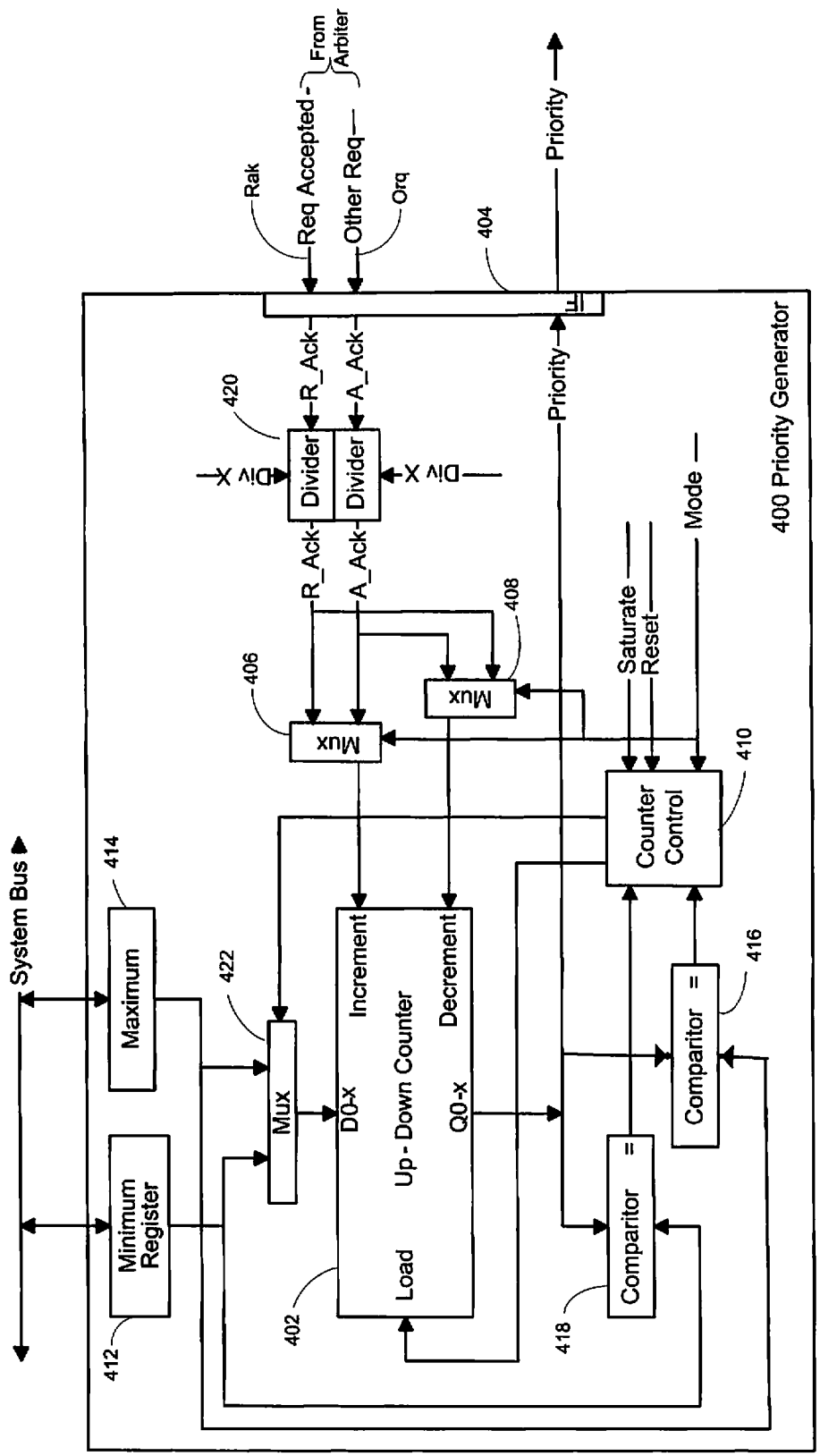
FIG. 4 is a diagram illustrating a device in one embodiment of the present invention.

With reference to FIG. 4 one embodiment of a priority generator 400 is presented. The priority generator, 400, comprises a counter 402, an interface 404 for receiving signals from an arbiter. The signals indicate decision of the arbiter about granting or denying access to a common resource in said multiprocessor apparatus and the counter 402 changes its value in response to said signal. The changes of the counter go in opposite directions depending on the type of signal received from the arbiter. The priority generator, 400, sends the modified value of the counter as a new priority value to the arbiter.

In a preferred embodiment the priority generator, 400, comprises a first multiplexer, 406, connected to an increment port of the counter 402 and a second multiplexer, 408, connected to the decrement port of the counter 402. Each of the multiplexers comprises two ports for receiving pulses from the interface 404. The pulses are generated by the interface in response to signals received from the arbiter. Said multiplexers are controlled by a counter control unit, 410. In the descending mode a pulse corresponding to the signal indicating access granted is directed by the multiplexer to the decrement port and a pulse corresponding to access denied decision to the increment port of the counter 402. Similarly the counter control unit 410 directs a pulse indicating access grant decision to the increment port and a pulse indicating access denied decision to the decrement port of the counter 402.

In a preferred embodiment the priority generator, 400, comprises a register 412, 414 for storing predefined lower and upper limits of the counter (min. and max values). The priority generator also comprises two comparators 416, 418. The first comparator, 416, is used to compare current value of the counter 402 with the upper limit, 414. The second comparator 418 is for comparing the current counter value with the lower limit, 412. The registers 412 and 414 are connected to the counter 402 via a third multiplexer 422. Results of the comparison carried out by the comparators 416 and 418 are input to the counter control unit 410. The counter control unit 410 instructs the counter to operate in a prescribed way when the counter reaches one of the limits (i.e. depending on whether the priority generator is in saturated or non-saturated mode).

In a preferred embodiment the counter control unit 410 is connected to a user interface (not shown) in order to enable the user to program the priority generator. In this embodiment the user has the possibility to select between the four combined modes of operation and also set the values of the limits or alternatively the user may change only the direction of the changes of the counter between ascending or descending modes or only between saturated and non-saturated modes.

In one embodiment each pulse train from the interface 404 passes through a divider 420 that is programmed to divide the number of pulses reaching the counter, this moderates the response of the counter with respect to the behaviour of the arbiter and hence rate of change of the priority.

With reference to FIG. 5 a multiprocessor apparatus 500 in accordance with one embodiment of the present invention is presented. In one embodiment the apparatus 500 is a communication device, e.g. a mobile phone. The apparatus comprises a resource 502 shared by at least part of said processors 504 and further comprising a plurality of priority generators 506 as discussed. Each of said priority generators, 506, is assigned to one of said processors 504. An arbiter, 508, for controlling access to said resource 502 has the plurality of priority generators 506 connected to it. Said arbiter, 508, sends a signal indicating granted access to one of said priority generators, 506 that has been granted access and a signal indicating access denied to the remaining priority generators 506, which have been denied said access.

The apparatus 502 also comprises a bus multiplexer 510 for multiplexing buses connecting the processors 504. The multiple buses are multiplexed onto a single bus to the common resource 502. A request from any bus for access to the resource is routed to the arbiter 508.

The arbiter 508 uses the requests to select the priorities it needs to compare to make a decision. It employs one or a number of algorithms known in the art when the priorities are the same. When they are not it selects the bus with the highest priority and instructs the bus multiplexer 510 to allow access to the associated bus (processor).

The bus multiplexer, 510, multiplexes all bus signals from multiple buses to a single bus, it also uses the bus protocol to force busses with pending request to wait while an existing transaction to common resource is completed. All access requests to the common resource 502 are sent to the arbiter 508 and the multiplexer receives an enable signal for the bus to be allowed access to the common resource from the arbiter.

In its basic operation the arbiter 508 compares the priorities of the processors requesting access to the common resource and only those, selects the highest priority and grants access to the associated bus. However, when two or more busses have the same priority the arbiter, 508, employs one of the algorithms known in the art and selectable by the system.

In one embodiment the arbiter 508 can use the round-robin algorithm.

The arbiter interfaces to a priority generator with two signals, one common to all priority generators (Other Request), and the other specific to a priority generator that has been granted access (Request Accepted).

An individual priority generator 506 produces a priority value for its bus, this value is from a range of values greater than the number of busses being arbitrated. For example 8 bit (256 level) priority value is used per bus even though there may be only 8 buses traditionally requiring only a 3 bit value. This is used to improve the granularity of the decision the arbiter makes based on the bus activity.

The invention claimed is:

1. A method of controlling access to a shared resource in a multiprocessor apparatus in which the processors request access to the resource and an arbiter grants or denies the access based on priority values assigned to the processors, wherein a priority value for an individual processor is generated by a priority generator in the following steps:
   maintaining a counter;
   receiving signals from the arbiter comprising a signal indicating whether access has been granted and a signal indicating whether access has been denied, wherein the arbiter transmits these signals at least to those processors which requested access to said resource;
   changing the value of the counter upon receipt of said signals, wherein the changes of the counter go in one direction if the signals received from the arbiter indicate that access has been granted and go in an opposite direction if the signals received from the arbiter indicate that access has been denied; and
   sending the modified value of the counter as a new priority value to the arbiter.

2. The method according to claim 1, wherein the signal indicating whether access has been granted controls decrementing the counter value and the signal indicating whether access has been denied controls incrementing the counter value.

3. The method according to claim 1, wherein the signal indicating whether access has been granted controls incrementing the counter value and the signal indicating whether access has been denied controls decrementing the counter value.

4. The method according to claim 1, further comprising limiting the counter by predefined lower and upper limits, comparing the value of the counter with said predefined lower and upper limits and if the counter value reaches one of said predefined lower and upper limits said counter value is changed to an opposite one of said predefined lower and upper limits.

5. The method according to claim 1, comprising limiting the counter by predefined lower and upper limits and changing the counter value in response only to one of the arbiter signals if said counter value is equal to one of said predefined lower or upper limits.

6. A device for generating a priority value of a processor in a multiprocessor apparatus, the device comprising a counter and an interface for receiving signals from an arbiter, wherein:
   the signals indicate a decision of the arbiter about granting or denying access to a common resource in said multiprocessor apparatus and the counter being adapted to change its value in response to said signals and the changes of the counter go in one direction if the signals received from the arbiter indicate that access has been granted and go in an opposite direction if the signals received from the arbiter indicate that access has been denied; and
   the device is also adapted to send a modified value of the counter as a new priority value to the arbiter.

7. The device according to claim 6, further comprising a first multiplexer connected to an increment port of the counter and a second multiplexer connected to a decrement port of the counter, wherein each of said multiplexers comprises two ports for receiving pulses from said interface in response to said signals from the arbiter and said multiplexers are controlled by a counter control unit.

8. The device according to claim 7, wherein the counter control unit is adapted to direct a pulse corresponding to the signal indicating whether access has been granted to the decrement port and a pulse corresponding to the signal indicating whether access has been denied to the increment port of the counter.

9. The device according to claim 7, wherein the counter control unit is adapted to direct a pulse corresponding to the signal indicating whether access has been granted to the increment port and a pulse corresponding to the signal indicating whether access has been denied to the decrement port of the counter.

10. The device according to claim 7, wherein the counter control unit is connected to a user interface, which allows the user to change the direction of change of the counter in response to the pulses.

11. The device according to claim 7, wherein the counter control unit is connected to a user interface, which allows the user to change the operation of the counter in response to a counter value reaching one of predefined lower and upper limits of the counter.

12. The device according to claim 6, comprising a register for storing values of predefined lower and upper limits of said counter, a first comparator for comparing the counter value with the upper limit and a second comparator for comparing the counter value with the lower limit, wherein results of said comparison are input to said counter control unit further adapted to control operation of the counter based on the inputs from the comparators.

13. The device according to claim 12, wherein said counter control unit is adapted to change the counter value to one of said lower and upper limits if said counter value reaches an opposite one of said lower and upper limits.

14. The device according to claim 12, wherein said counter is adapted to change its value in response only to one of the pulses if said counter value is equal to one of said predefined lower and upper limits.

15. The device according to claim 6, comprising a divider located between the interface and the multiplexers to control a rate of change of the counter value.

16. A multiprocessor apparatus comprising a resource shared by at least part of said processors, the apparatus further comprising a plurality of priority generators assigned to said processors and an arbiter for controlling access to said resource, wherein said arbiter is adapted to send a signal indicating granted access to one of said priority generators that has been granted access and a signal indicating access denied to priority generators, which have not been granted access; and
   wherein each of said priority generators comprises a counter and an interface for receiving signals from said arbiter, wherein:
   the signals indicate a decision of the arbiter about granting or denying access to a common resource in said multiprocessor apparatus and the counter being adapted to change its value in response to said signals and the changes of the counter go in one direction if the signals received from the arbiter indicate that access has been granted and go in an opposite direction if the signals received from the arbiter indicate that access has been denied; and the each of said priority generators is also adapted to send a modified value of the counter as a new priority value to the arbiter.

* * * * *